United States Patent [19]

Gray et al.

[11] 3,729,909
[45] May 1, 1973

[54] COTTON STRIPPING MEANS
[75] Inventors: James H. Gray, Paradise Valley; William E. Rood, Jr., Phoenix, both of Ariz.
[73] Assignee: Garland Steel Company, Phoenix, Ariz.
[22] Filed: Apr. 24, 1972
[21] Appl. No.: 247,018

[52] U.S. Cl. ............................................ 56/34, 56/127
[51] Int. Cl. ............................................ A01d 45/20
[58] Field of Search ............ 56/33, 34, 35, 126–130, 56/330

[56] References Cited
UNITED STATES PATENTS

| | | |
|---|---|---|
| 700,165 | 5/1902 | Blydenburgh .......................... 56/330 |
| 1,023,697 | 4/1912 | Weber .................................... 56/330 |
| 1,353,172 | 9/1920 | Mahtes .................................... 56/330 |
| 1,362,285 | 12/1920 | Generouss ............................... 56/330 |
| 3,408,800 | 11/1968 | Jezek, Jr. ............................... 56/34 |

*Primary Examiner*—Russell R. Kinsey
*Attorney*—William C. Cahill et al.

[57] ABSTRACT

Cotton stripper fingers are disclosed incorporating finger supports having pairs of finger arms extending from the forward ends of the finger supports upwardly and backwardly along the finger supports. The finger arms are parallel to each other and incorporate longitudinal edges protruding into stalk-receiving channels between adjacent finger supports.

9 Claims, 9 Drawing Figures

Patented May 1, 1973

COTTON STRIPPING MEANS

The present invention pertains to cotton strippers, and more particularly, to an improved finger-type cotton stripper to prevent jamming, inefficient stripping of the cotton bolls from the cotton stalks, and excessive trash being gathered with the cotton.

It is well known that cotton can be harvested under certain conditions through the utilization of a plurality of stripper fingers which comprise elongated, parallel, spaced-apart tines extending downward and moved forward by a tractive vehicle. As the fingers are moved forward over the ground, they comb through the cotton stalks. The stalks slip between the fingers and as the fingers move through the stalks, the inclined surfaces of the fingers (stripping edges) strip the cotton bolls from the stalk, ideally leaving the bolls of cotton on the top side of the plurality of stripper fingers to be moved into a receiving chamber, and leaving the cotton stalks in the ground below and behind the stripper fingers.

Only under very definite and ideal conditions may strippers of the above type be used and, even then, substantial difficulties and problems are encountered. Because of the economy of this method of harvesting cotton, continued attempts have been made to overcome these problems. These attempts have been singularly unsuccessful. Since repeated reference is made herein to present cotton strippers, it is necessary to stress that machines of this type are strictly in experimental stages and because of the multitude of problems encountered have in the past seldom been satisfactorily used.

Cotton farmers throughout the United States have for several years been under severe economic pressure because of high growing and harvesting costs and increased competitive pressure from foreign cotton growers. The greatest single expense of producing cotton is the cost of harvesting and because of its simplicity a cotton stripper of the type described is by far the cheapest known method of harvesting cotton.

The use of cotton strippers of this type also allows the cotton farmer to raise, in a shorter length of time, small high density cotton plants in broad or narrow row patterns which reduce planting and cultivating costs, require less water, fertilizer and insecticides, and produce higher per acre yields of lint cotton. However, since the cotton grower must rely entirely upon cotton strippers to harvest this type of cotton and since present cotton strippers of this type can, at the best, be operated only under ideal conditions and even then with considerable difficulty, the cotton grower runs the risk of losing his entire crop if anything less than ideal conditions prevail.

It is therefore an object of the present invention to provide an improved finger-type cotton stripper for removing cotton bolls from cotton stalks.

It is another object of the present invention to provide a cotton stripper incorporating cotton stripping fingers mounted on finger supports to effectively strip cotton bolls from cotton stalks while significantly reducing the probability of clogging or jamming the stripper.

It is still another object of the present invention to provide a finger-type cotton stripper that will effectively remove cotton bolls from cotton stalks under a variety of field conditions without losing significant quantities of cotton bolls or damaging the cotton thus stripped.

These and other objects of the present invention will become apparent to those skilled in the art as the description thereof proceeds.

The present invention may more readily be described by reference to the accompanying drawings, in which:

FIG. 1 is a perspective view showing cotton stripping fingers constructed in accordance with the teachings of the present invention mounted on a cotton stripping machine.

FIGS. 2, 3, and 4 are schematic representations of presently developed stripper fingers illustrating the chief difficulties encountered in the utilization of such fingers.

Figure 1:
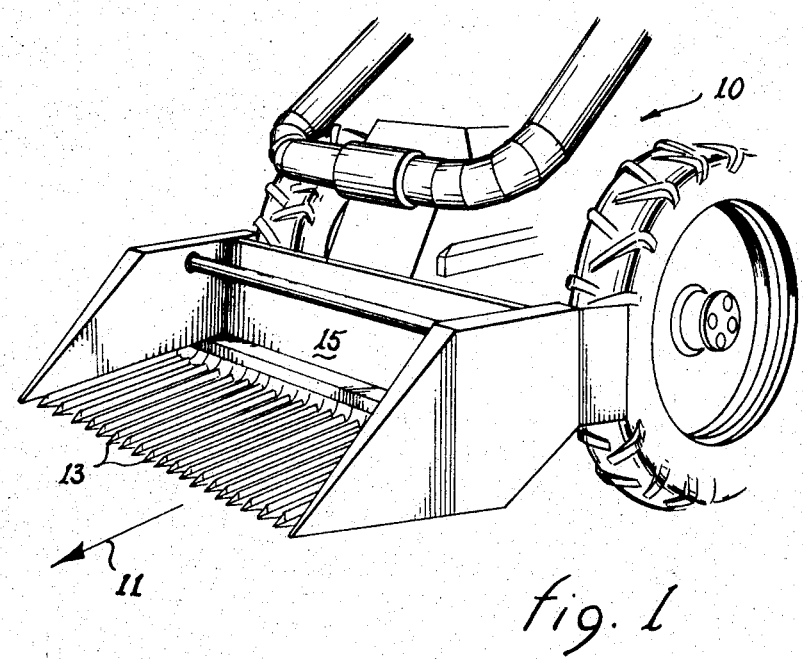

Referring now to FIG. 1, a portion of a cotton stripping machine, somewhat pictorial, is shown at 10. The machine incorporates any convenient means of motive power and generally moves in the direction indicated by the arrow 11. A plurality of cotton stripping fingers 13 are mounted in a suitable manner and extend forwardly and downwardly in front of the machine 10. As the machine is moved forward over the ground, the fingers 13 comb through the cotton stalks and as the machine forces the fingers through the cotton, the bolls on the stalk are torn loose therefrom and are fed backwardly and upwardly into a receiving area which is schematically indicated at 15. It will be apparent to those skilled in the art that a variety of designs are available for dealing with the cotton bolls as they enter the area 15, it being sufficient for purposes of description of this invention to simply schematically indicate where such bolls are ultimately delivered.

Figures 2, 3:
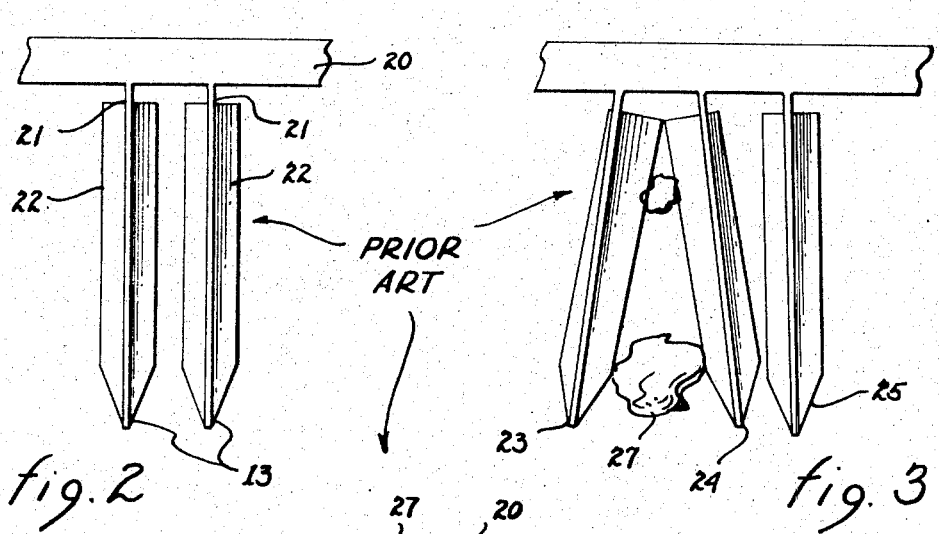
Figure 4:
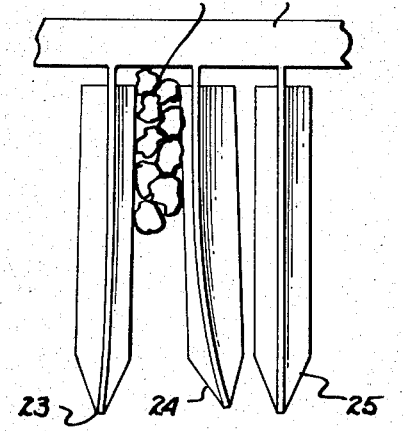
Figure 5:
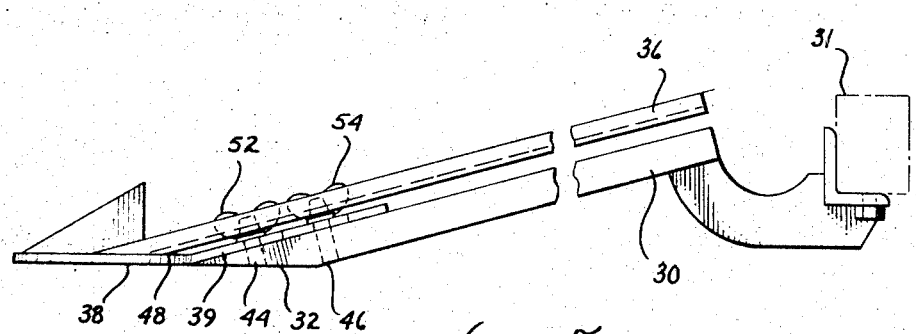
FIG. 5 is a side elevation of a stripper finger constructed in accordance with the teachings of the present invention, shown mounted on a stripper finger.
Figure 8:
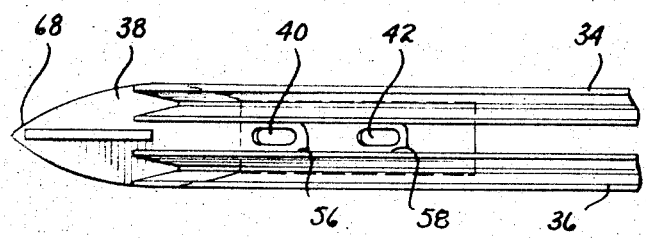
FIG. 8 is a top view of a portion of FIG. 6.
Figure 6:
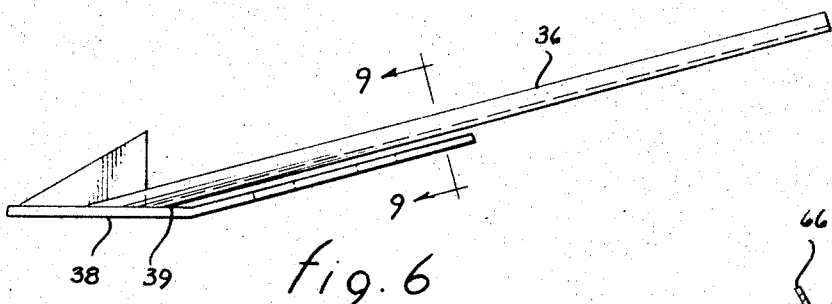
FIG. 6 is a side elevation of a stripper finger constructed in accordance with the teachings of the present invention.
Figure 7:
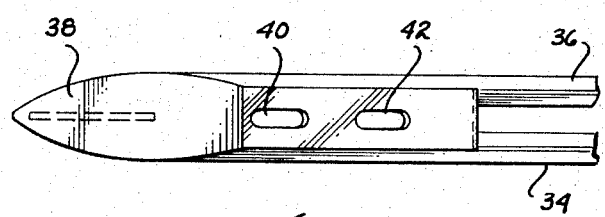
FIG. 7 is a bottom view of a portion of FIG. 6.

The stripper fingers that are typically present at today's state of the art are schematically illustrated in FIGS. 2, 3, and 4. Referring to those figures, it may be seen that the fingers 13 extend forwardly and downwardly from a suitable mounting bracket 20 and comprise rods or bars 21 to which are attached plates 22; a variety of schemes have been suggested for the attachment of the plate to the bars 21. The fingers 13 are shown in FIG. 2 before the stripper engages cotton stalks. To accommodate cotton stalks that are not centered in the space between the respective fingers 13, the fingers are required to be flexible. The prior art has suggested numerous methods for insuring the flexibility of these fingers. However, such fingers and finger supports are easily spread apart by incoming cotton stalks, resulting in the stripper finger points being forced apart and the stripper fingers being forced into an undesirable inverted V position, such as that shown in FIG. 3. In FIG. 3, it may be seen that as the cotton stalk or plurality of stalks 27 forces it way between fingers 23 and 24, the space between 23 and 24 is forced into the inverted V position, causing the space between adjacent fingers 24 and 25 to be essentially closed. As the stripper continues to move over the ground, the stalk or plurality of stalks 27 is wedged and compressed and forced backwardly against the supporting bracket 20; subsequent stalks are jammed in behind the stalk 27 thus compounding the problem as schematically illustrated in FIG. 4. As the stalks continue to wedge into the space between the fingers 23 and 24, both fingers 23 and 24 are flexed outwardly away from each other, closing the space between adjacent fingers. A "-domino" effect results where the interfinger spaces are either completely closed off or greatly narrowed, such that cotton stalks are not stripped in the area of the narrowed or closed spaces and the stalks, such as stalk 27, that are wedged into the open space are either broken off or torn from the ground and remain in a compacted condition.

It may therefore be seen that when jamming or wedging occurs at any point between any two of the stripper fingers, the jammed cotton and stalks are forced to the back end of the fingers by incoming stalks until no more can be taken in. Then, the build up toward the front of the fingers continues until the entire stripping space between the respective fingers is jammed. This jamming causes the effected fingers to spread and interfere with adjacent stripper spaces, resulting in additional jamming and similar build up between these fingers and adjacent fingers until all fingers are either plugged or the spaces therebetween are closed off to incoming stalks.

Referring now to FIGS. 5 – 9, the cotton stripper finger of the present invention is shown. Each of the fingers of the present invention is supported on a finger support 30 which extends forwardly and downwardly from a suitable mounting bracket 31 secured to the stripper machine. The finger supports, unlike the finger supports of the prior art, are relatively inflexible and are purposely made stiffer than would normally be considered proper for cotton picking. Each of the finger supports, such as that shown at 30, terminates in a tip portion 32 and, each support forms a cotton receiving channel between it and each adjacent finger support.

Each finger support 30 supports a stripper finger comprising a pair of finger arms 34 and 36 extending upwardly and backwardly and parallel to the support 30. The finger arms are welded or otherwise permanently secured to a foot member 38 having an angularly upwardly extending plate 39 in contact with the tip portion of the finger support 30. The plate 39 includes slots 40 and 42 to permit the passage of fastening bolts 44 and 46 respectively threadily engaging corresponding holes in the finger support 30. It may be seen that the finger arms 34 and 36 are attached to the foot member 38 only in the area 48 and are capable of flexing about that area of attachment. It may be noted that wing nuts 52 and 54 are provided and are dimensioned such that the wing of the respective nuts contact the finger arms in areas 56 and 58 respectively; in this manner, the wing nuts 52 and 54 may be forced into contact with the finger arms for adjustably limiting the flexure of the arms.

The foot member 38 extends forwardly from the tip portion 32 of the finger support 30. This forward extension is parallel to the ground. The tapered points of the prior art stripper fingers must not be permitted to touch the ground and therefore must be carefully positioned to prevent such contact. The foot member 38 acting as a tip extension extending parallel to the ground enables the leading edges of the stripper fingers to be positioned close to the ground to strip even those bolls that are close to the ground.

Figure 9:
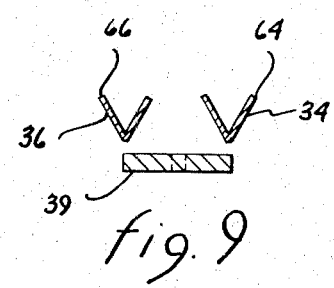
FIG. 9 is a cross-sectional view of FIG. 6 taken along line 9—9.

It may be seen by reference to FIG. 9 that the finger arms 34 and 36 have a "V" cross section. It may also be seen that the finger arms extend parallel to the finger support 30 and incorporate longitudinal edges 64 and 66 respectively that protrude into the stalk-receiving channels between each adjacent finger support. The finger arms 34 and 36 are therefore independently flexible in the plane of the fingers and are free to contact stalks engaging the finger arm without affecting the finger arm position parallel thereto on the opposite side of the respective finger support 30.

The operation of the stripper fingers of the present invention may now be described. The foot member 38 and the portion thereof acting as a tip extension 68 may be positioned in close proximity to the ground to insure contact of the finger with bolls growing close to the ground. As the stripper fingers are forced through the cotton stalks, the stalks contact the tip 68 of the foot member and are guided to cotton receiving channels between finger supports, such as finger support 30. As the fingers comb through the stalks, the finger arms 34 and 36 contact the stalks and effectively hold the bolls therefrom. The size and number of the stalks and bolls is accommodated by the lateral flexure of the respective finger arms 34 and 36. In the event the cotton stalk receiving area between adjacent finger supports is subjected to either a large stalk or number of stalks that would ordinarily result in jamming of the stalk-receiving area, the finger arms merely flex to accommodate the increased bulk being presented to the area; the flexure of the finger arms does not affect the cotton stalk receiving area adjacent thereto since the flexure of the finger arms is independent and cannot result in the previously described "domino" effect.

I claim:

1. In a cotton stripper machine, the improvement comprising: a plurality of parallel finger supports each mounted on and extending forwardly and downwardly from said stripper machine to terminate in a tip portion and forming cotton stalk receiving channels therebetween; a plurality of stripper fingers, each mounted at their forward ends on a different one of said finger supports; each of said stripper fingers including:
   a. a foot member secured to the tip portion of said one of said finger supports,
   b. a pair of finger arms extending from said foot member upwardly and backwardly along said one of said finger supports, each of said finger arms having a longitudinal edge protruding into a respective one of the stalk receiving channels along said one finger support;

said finger support being more rigid than said finger arms.

2. The combination set forth in claim 1, wherein each of said foot members includes slots for receiving bolts to adjustably secure said foot to one of said finger supports.

3. The combination set forth in claim 1, wherein each of said finger arms comprises a member having an open portion facing upwardly.

4. The combination set forth in claim 3, wherein said member has a "V" shaped cross section.

5. In a cotton stripper machine, the improvement comprising: a plurality of parallel finger supports, each mounted on and extending forwardly and downwardly from said stripper machine to terminate in a tip portion and forming cotton stalk receiving channels therebetween; a plurality of stripper fingers, each mounted at their forward ends on a different one of said finger supports; each of said stripper fingers including:
  a. a foot member secured to the tip portion of said one of said finger supports,
  b. a pair of finger arms parallel to each other and to one of said finger supports, and extending from said foot member upwardly and backwardly along said one of said finger supports, each of said finger arms having a longitudinal edge protruding into a respective one of the stalk receiving channels along either side of said one finger support.

6. The combination set forth in claim 5, wherein each of said foot members includes slots for receiving bolts to adjustably secure said foot to one of said finger supports.

7. The combination set forth in claim 5, wherein each of said finger arms comprises a member having an open portion facing upwardly.

8. The combination set forth in claim 5, including means positioned between said finger arms for adjusting the flexibility of said arms.

9. The combination set forth in claim 5, wherein each of said foot members include a tip extension extending forwardly from said tip portion parallel to the ground and having a tapered point for separating and guiding stalks into said stalk receiving channels.

* * * * *